Z. BREED.
Hay-Rake.
No. 7,434.  Patented June 18, 1850.
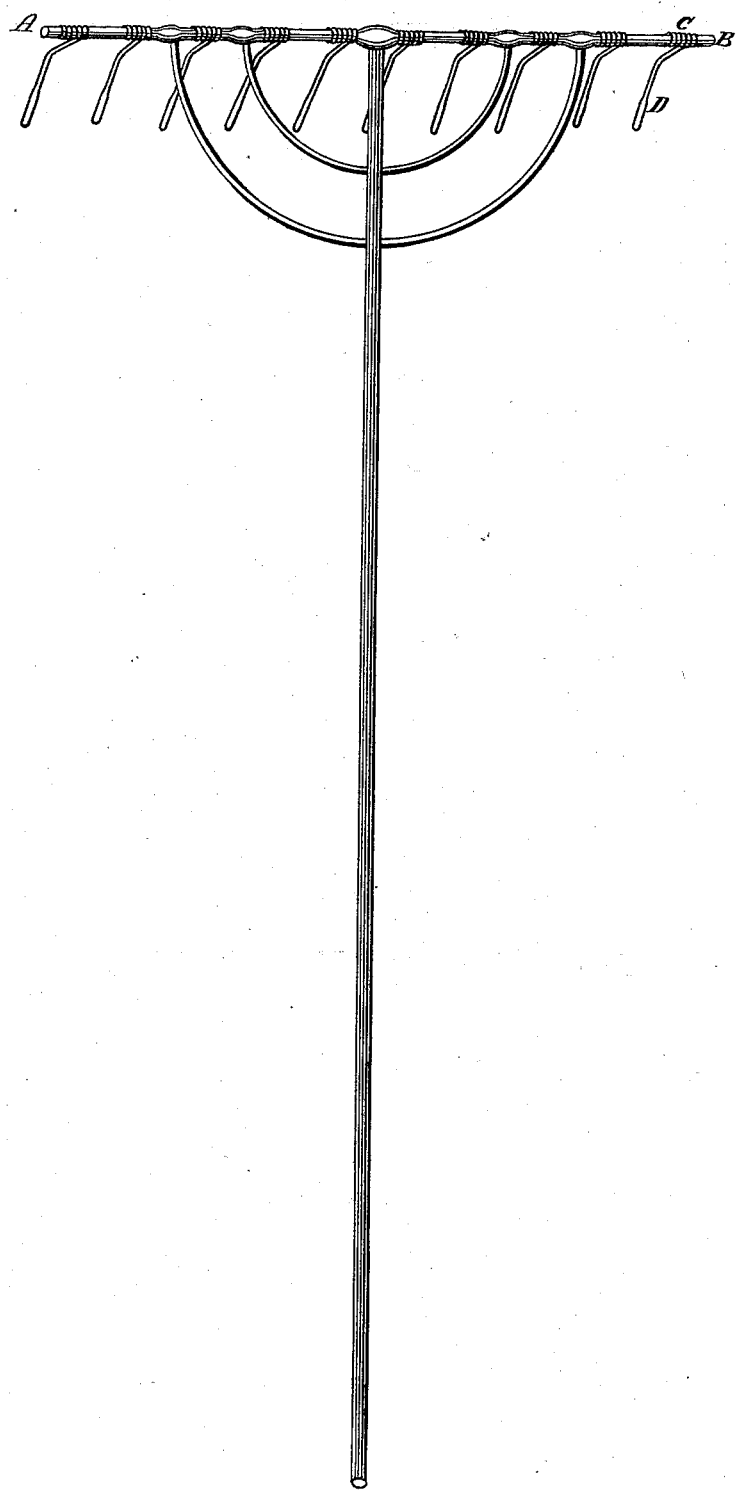

UNITED STATES PATENT OFFICE.

ZEPHANIAH BREED, OF WARE, NEW HAMPSHIRE.

IMPROVEMENT IN SPRING-TEETH OF HAY-RAKES.

Specification forming part of Letters Patent No. 7,434, dated June 18, 1850.

*To all whom it may concern:*

Be it known that I, ZEPHANIAH BREED, of Ware, Hillsborough county, State of New Hampshire, have invented a new and useful Improvement in Hay-Rakes; and I do hereby declare that the following is a full and exact description thereof, reference being had to the accompanying drawing and the letters of reference marked thereon.

The nature of my invention consists in applying the spiral spring in a way to form a self-supporting spring-tooth.

The stales and bows for the hand-rake are made as usual—the head, flat, square, or round, made of wood or metal, and affixed to the stale and bows in any convenient way. I prefer the round head, made of wood, as A B in the drawing. The teeth are made of wire, flat, square, or round. The wire, being cut the desirable length, is doubled in the middle; or it may be used single. The two single ends are inserted firmly into the head. The wire is then brought down the side of the head next the stale, under and up the other side, and so on till a coil is formed sufficient for the spring, (see letter C.) The double or loop end of the wire projects below the head sufficiently to form the tooth, (see letter D,) which may be straight or curved, as is convenient for the user.

The teeth for the horse-rake I propose to construct and apply in the same manner as above described.

The hand-rake constructed as above described makes a beautiful implement for the farmer, not heavier than a stout wooden-toothed rake, and afforded as cheap as the first quality of hand-rake now in use.

The advantages of the rake made in the manner above described are these: First, the teeth, being elastic, spring over many obstructions that the wooden tooth would cling to; second, they will not break, like the wooden teeth, consequently the rake must be much more durable; third, they are more convenient to use.

The advantages of this form of tooth applied to the horse-rake are these: First, I get a more elastic spring with a given weight of wire than I can with a single wire; second, it is a self-supporting tooth, one fork keeping the other in place, thus doing away with all staples and bolts for that purpose; third, I get a round point to come in contact with the ground instead of a sharp one—a serious objection to the single tooth; fourth, only one piece of wood will be needed in making the head, the rake consequently being much lighter; fifth, should a tooth chance to break its place can be supplied without taking the rake in pieces, as is the case with the rakes now in use.

What I claim as my invention, and desire to secure by Letters Patent, is—

The construction of the spring-teeth of the hay-rake of a double wire in place of the single one generally used, as described in the specification.

ZEPHANIAH BREED.

Witnesses:
LEVI W. GOVE,
HIRAM SIMONS.